(12) United States Patent
Takesaki et al.

(10) Patent No.: US 12,116,052 B2
(45) Date of Patent: Oct. 15, 2024

(54) MOTOR DRIVE SYSTEM

(71) Applicants: DENSO CORPORATION, Kariya (JP); TOYOTA JIDOSHA KABUSHIKI KAISHA, Toyota (JP); JTEKT CORPORATION, Kariya (JP)

(72) Inventors: Akira Takesaki, Kariya (JP); Hisashi Kameya, Kariya (JP); Hiroki Tomizawa, Kariya (JP); Masaharu Yamashita, Toyota (JP); Kenji Shibata, Nagoya (JP); Yosuke Yamashita, Nagoya (JP); Shintaro Takayama, Toyota (JP); Toshihiro Takahashi, Nishio (JP); Yuji Fujita, Okazaki (JP); Kenichi Abe, Okazaki (JP); Yugo Nagashima, Anjo (JP)

(73) Assignees: DENSO CORPORATION, Kariya (JP); TOYOTA JIDOSHA KABUSHIKI KAISHA, Toyota (JP); JTEKT CORPORATION, Kariya (JP)

( * ) Notice: Subject to any disclaimer, the term of this patent is extended or adjusted under 35 U.S.C. 154(b) by 225 days.

(21) Appl. No.: 17/662,118

(22) Filed: May 5, 2022

(65) Prior Publication Data
US 2022/0258794 A1 Aug. 18, 2022

Related U.S. Application Data

(63) Continuation of application No. PCT/JP2020/041444, filed on Nov. 6, 2020.

(30) Foreign Application Priority Data
Nov. 11, 2019 (JP) ................................. 2019-204174

(51) Int. Cl.
*B62D 5/04* (2006.01)
*B62D 6/00* (2006.01)

(52) U.S. Cl.
CPC .......... *B62D 5/0487* (2013.01); *B62D 5/046* (2013.01); *B62D 6/00* (2013.01)

(58) Field of Classification Search
CPC ........ B62D 5/0487; B62D 5/046; B62D 6/00; B62D 5/006; B62D 5/003; B62D 5/0484;
(Continued)

(56) References Cited

U.S. PATENT DOCUMENTS

2006/0253726 A1* 11/2006 Kukshya ............... G06F 11/202
714/E11.078
2019/0100237 A1* 4/2019 Klesing ............... B62D 5/0493
(Continued)

FOREIGN PATENT DOCUMENTS

JP 2004-338563 A 12/2004
JP 4848717 B2 12/2011

*Primary Examiner* — Abby Y Lin
*Assistant Examiner* — Esvinder Singh
(74) *Attorney, Agent, or Firm* — MASCHOFF BRENNAN

(57) ABSTRACT

Control calculation units of a back system in each actuator operate by a collaborative drive mode in which a torque is output to a motor drive unit by using an information transmitted and received mutually by a communication between the systems in common. Cooperative control calculation units in a reaction force actuator and a turning actuator can operate in cooperation with each other based on the information transmitted and received mutually by a communication between actuators. A communication between adjacent systems and a communication between adjacent actuators are restored, when a focus control calculation unit is restored, after the focus control calculation unit is stopped during operation and at least one of the communication between adjacent systems or the communication between adjacent actuators is interrupted.

9 Claims, 10 Drawing Sheets

(58) Field of Classification Search
CPC ........ B62D 5/001; B62D 5/091; B62D 5/092;
B62D 5/30; B62D 6/008; B62D 5/0481;
B62D 5/005; B62D 5/0493; G05B 9/03;
G05B 2219/14014; G05B 2219/14127;
G05B 2219/24175; G05B 2219/24177;
G05B 2219/24187; G05B 2219/25163;
G05B 2219/31245; G05B 2219/33235;
G05B 2219/34482; G05B 2219/40208;
G05B 2219/42317; G05B 2219/24139;
G05B 2219/24199
See application file for complete search history.

(56) References Cited

U.S. PATENT DOCUMENTS

| | | |
|---|---|---|
| 2019/0144028 A1 | 5/2019 | Taki et al. |
| 2019/0260324 A1 | 8/2019 | Kuramitsu et al. |
| 2021/0129855 A1* | 5/2021 | Nakao ................ G05B 19/0428 |
| 2022/0239406 A1* | 7/2022 | Nakamura .............. H04L 12/46 |
| 2022/0250675 A1* | 8/2022 | Jeong ................ H04L 12/40189 |

* cited by examiner

COLLABORATIVE DRIVE

SINGLE SYSTEM DRIVE

INDEPENDENT DRIVE (WITHOUT OUTPUT LIMIT)

INDEPENDENT DRIVE (TM LIMITS OUTPUT)

MOTOR DRIVE SYSTEM

CROSS REFERENCE TO RELATED APPLICATIONS

This application is a continuation application of International Patent Application No. PCT/JP2020/041444 filed on Nov. 6, 2020, which designated the U.S. and based on and claims the benefits of priority of Japanese Patent Application No. 2019-204174 filed on Nov. 11, 2019. The entire disclosure of all of the above applications is incorporated herein by reference.

TECHNICAL FIELD

The present disclosure relates to a motor drive system.

BACKGROUND

Conventionally, in a motor drive system that generally drives a motor of steer-by-wire system, a plurality of control calculation units that perform calculations related to motor drive and a plurality of motor drive units that drive the motor based on a drive signal generated by the control calculation unit are redundantly provided.

SUMMARY

An object of the present disclosure is to provide a motor drive system that prevent excessive stoppage of function even though normal operation can be restored, when the control calculation unit of a reaction force actuator or a turning actuator in the steer-by-wire system is momentarily stopped.

The motor drive system of the present disclosure restores a communication between adjacent systems and a communication between adjacent actuators, when a focus control calculation unit is restored, after the focus control calculation unit is stopped during operation and at least one of the communication between adjacent systems or the communication between adjacent actuators is interrupted. In the present disclosure, when the focus control calculation unit returns to normal operation, the communication between adjacent systems and the communication between adjacent actuators are restored, and a motor drive control is restarted.

BRIEF DESCRIPTION OF DRAWINGS

The above and other objects, features and advantages of the present disclosure will become more apparent from the following detailed description taken in conjunction with the accompanying drawings.

In the drawings.

DETAILED DESCRIPTION

Figure 1:
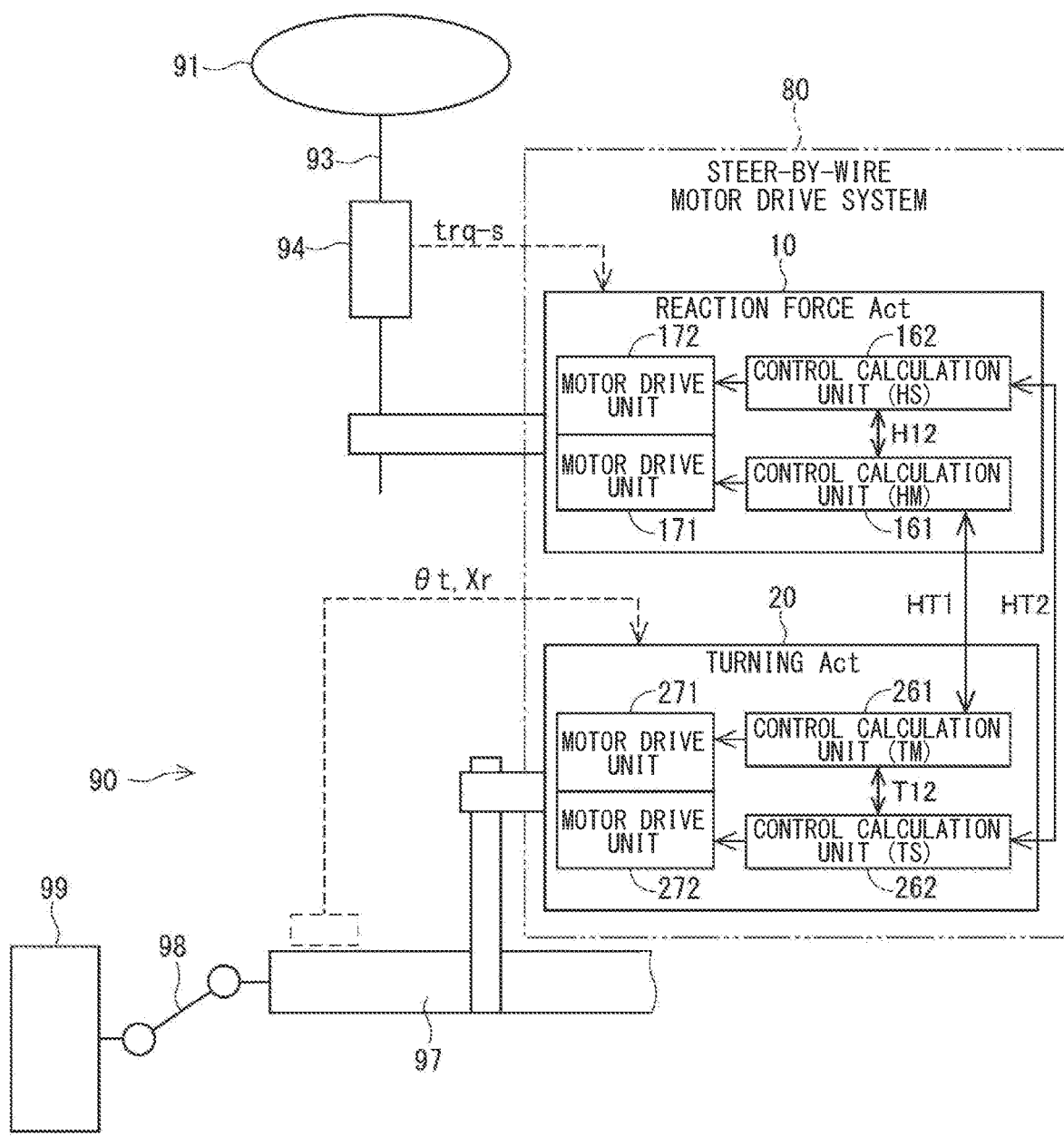
FIG. 1 is an overall configuration diagram of a motor drive system according to an embodiment applied to a steer-by-wire system.

In an assumable example, in a motor drive system that generally drives a motor of steer-by-wire system, a plurality of control calculation units that perform calculations related to motor drive and a plurality of motor drive units that drive the motor based on a drive signal generated by the control calculation unit are redundantly provided. For example, a fail-safe control device of the control system, when one of the two ECUs that control reaction force or turning fails, stops the failed ECU and continues the control by one normal ECU. When one of the two motors fails, the failed steering reaction force motor or turning motor is stopped, and control is continued using one normal motor.

A device of a third embodiment disclosed in Japanese Patent No. 4848717 (hereinafter, referred to as Patent Document) has two reaction force ECUs (A) and (D), each of which controls a drive of a steering reaction force motor, and two turning ECUs (B) and (C) each of which controls a drive of a turning motor. For example, when one reaction force ECU (A) fails, the device stops the reaction force ECU (A), and continues one normal reaction force ECU (D), two turning ECUs (B) and (C), and the drive control of the steering reaction force motor and the turning motor.

In the present specification, the "reaction force ECU" and the "steering reaction force motor" of Patent Document are referred to as a "reaction actuator", and the "turning ECU" and the "turning motor" of Patent Document referred to as a "turning actuator". Further, the "reaction force ECU" and the "steering reaction force motor" of Patent Document are respectively referred to as a "control calculation unit of the reaction force actuator" and a "motor drive unit of the reaction force actuator". The "turning ECU" and "turning motor" of Patent Document are respectively referred to as "control calculation unit of the turning actuator" and a "motor drive unit of the turning actuator".

The entire disclosure of Japanese Patent No. 4848717 as Patent Document is incorporated herein by reference.

Further, the "actuator" in the present specification includes not only a mechanical element driven by a drive signal from an outside but also a drive device in which a motor drive unit outputs torque by a drive signal generated by a control calculation unit inside the actuator. The control calculation unit and the motor drive unit in the actuator may be physically integrated or may be separately configured via a signal line.

In Patent Document, a configuration in which the reaction force ECU (A) which is "one control calculation unit of the reaction force actuator" and the turning ECU (B) which is "one control calculation unit of the turning actuator" form a pair and send and receive information to and from each other is assumed. If one of the control calculation units of the reaction force actuator fails, the motor drive unit controlled by the control calculation unit of the paired turning actuator may erroneously output, and the vehicle may be deflected in a direction not intended by the driver. Therefore, from a viewpoint of fail-safe, it is considered preferable that the control calculation unit of each actuator of the system in which the failure has occurred stops the motor drive control together.

However, the failure of the control calculation unit includes a case where the operation is momentarily stopped due to a power failure or a reset and then returned to normal. Even in the case of such a momentary stop, if the motor drive control of both actuators of the system in which the failure has occurred is constantly stopped, a system function may be deteriorated due to excessive fail-safe.

An object of the present disclosure is to provide a motor drive system that prevent excessive stoppage of function even though normal operation can be restored, when the control calculation unit of the reaction force actuator or the turning actuator in the steer-by-wire system is momentarily stopped.

The present disclosure is a motor drive system including two actuators, a reaction force actuator and a turning actuator, in a steer-by-wire system in which a vehicle steering mechanism and a turning mechanism are mechanically separated. The reaction force actuator functions as a motor that outputs a reaction force torque according to a turning torque of the driver and a road surface reaction force. The turning actuator functions as a motor that outputs the turning torque for turning the wheels.

The reaction force actuator and the turning actuator each have two control calculation units provided redundantly and two motor drive units provided redundantly. The two control calculation units perform calculations related to a motor drive control. The two motor drive units are operated based on the drive signals generated by the corresponding control calculation units and output the torque. For example, in a polyphase brushless motor, the motor drive unit is composed of an inverter that supplies voltage, a polyphase winding wound around a stator, a rotor having a permanent magnet, and the like. In addition, like a multi-winding motor, a rotor or the like may be provided in common in a plurality of motor drive units.

The two sets of control calculation units and motor drive units corresponding to each other in each actuator are defined as a first system and a second system, respectively, and the other system with respect to one system is defined as a "back system". The control calculation units of the back system in each actuator can operate by the "collaborative drive mode" in which the torque is output to the motor drive unit by using the information transmitted and received mutually by a communication between the systems in common.

In the reaction force actuator and the turning actuator, the "cooperative control calculation units", which are the control calculation units of the systems paired with each other, can operate in cooperation with each other based on the information transmitted and received mutually by a communication between the actuators.

Of the four control calculation units of the two systems for each actuator, one of the control calculation units of interest is referred to as a "focus control calculation unit". The communication between the systems between the focus control calculation unit and the control calculation unit of the back system of the focus control calculation unit is defined as a "communication between the adjacent systems", and the communication between the actuators between the focus control calculation unit and the cooperative control calculation unit of the focus control calculation unit is defined as a "communication between the adjacent actuators".

The motor drive system of the present disclosure restores the communication between the adjacent systems and the communication between the adjacent actuators, when the focus control calculation unit is restored, after the focus control calculation unit is stopped during operation and at least one of the communication between the adjacent systems or the communication between the adjacent actuators is interrupted. In the present disclosure, when the focus control calculation unit returns to normal operation, the communication between the adjacent systems and the communication between the adjacent actuators are restored, and motor drive control is restarted so that excessive fail-safe can be avoided and system functions can be maintained favorably.

Preferably, each control calculation unit can be operated by a "recoverable mode" and a "failure determination mode" in addition to the collaborative drive mode. In the recoverable mode, when there is a possibility of returning to the normal operation of the focus control calculation unit, the torque is output to the motor drive unit of the own system based on a calculation result of itself without using the information by the communication between the systems. In the failure determination mode, when the failure of the focus control calculation unit is confirmed, the torque is output to the control calculation unit corresponding to the control calculation unit of the back system of the system where the failure occurred. Specifically, the "recoverable mode" is realized as, for example, an "independent drive mode", and the "failure determination mode" is realized as, for example, a "single system drive mode".

Hereinafter, one embodiment of a motor drive system of the present disclosure will be described with reference to the drawings. The motor drive system in one embodiment includes two actuators, a reaction force actuator and a turning actuator, in a steer-by-wire system in which a vehicle steering mechanism and a turning mechanism are mechanically separated. Each actuator has two control calculation units provided redundantly and two motor drive units provided redundantly. A unit of a combination of the control calculation unit and the motor drive unit corresponding to each other in each actuator is defined as a "system".

One Embodiment

FIG. 1 shows a motor drive system 80 applied to a steer-by-wire system 90 of a vehicle. A steering mechanism of the steer-by-wire system 90 includes a steering wheel 91, a steering shaft 93, a turning torque sensor 94, a reaction force actuator 10, and the like. A turning mechanism of the steer-by-wire system 90 includes a rack 97, a knuckle arm 98, a turning actuator 20, and the like, and the wheels 99 are turned by a turning torque output by the turning actuator 20. Wheel 99 shows only one side, and the wheel on the other side is not shown.

The motor drive system 80 includes the reaction force actuator 10 and the turning actuator 20. In the figure below, "Act" means "actuator". The reaction force actuator 10 functions as a motor that outputs a reaction force torque according to a turning torque of the driver and a road surface reaction force. By rotating the steering wheel 91 so that the reaction force actuator 10 applies the reaction force, an appropriate steering feeling is given to the driver. The turning actuator 20 functions as a motor that outputs the turning torque for turning the wheels 99. When the turning actuator 20 appropriately turns the wheels 99, the vehicle is deflected in a direction intended by the driver.

Each actuator 10 and 20 has a redundant configuration of two systems. That is, the reaction force actuator 10 has two control calculation units 161 and 162 provided redundantly, and two motor drive units 171 and 172 provided redundantly. The turning actuator 20 has two control calculation units 261 and 262 provided redundantly, and two motor drive units 271 and 272 provided redundantly.

Hereinafter, the two sets of control calculation units and motor drive units corresponding to each other in each actuator are defined as a "first system" and a "second system", respectively, and the other system with respect to one system is defined as a "back system". For example, there may be a master-slave relationship between the first system and the second system, and the first system may function as a main (or master) and the second system may function as a sub (or slave). Alternatively, the first system and the second system may have an equal relationship. "1" is added to an end of the code for an element of the first system, and "2" is added to an end of the code to an element of the second system.

Figure 2:
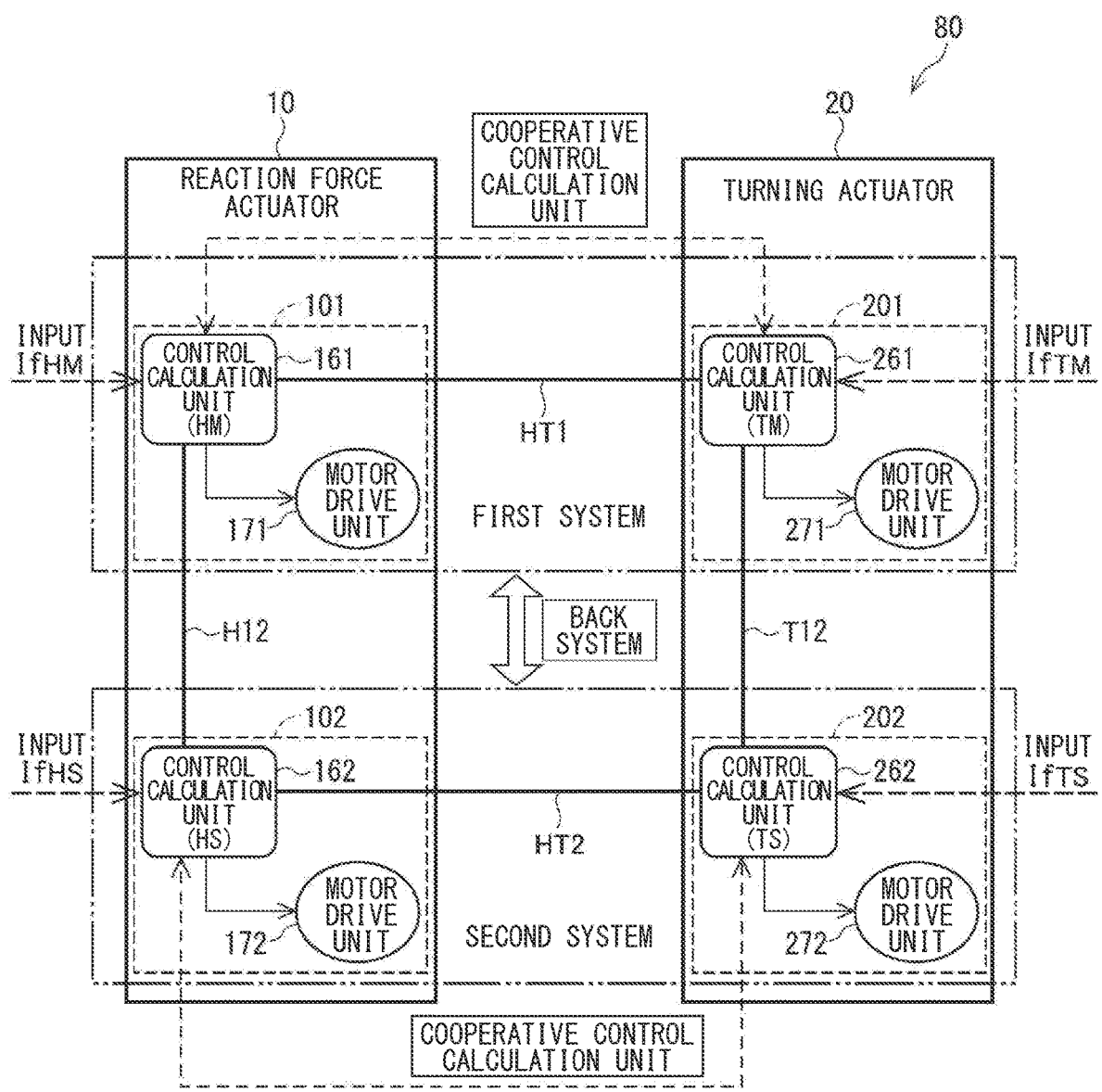
FIG. 2 is a schematic diagram of the motor drive system of FIG. 1.
Figure 5:
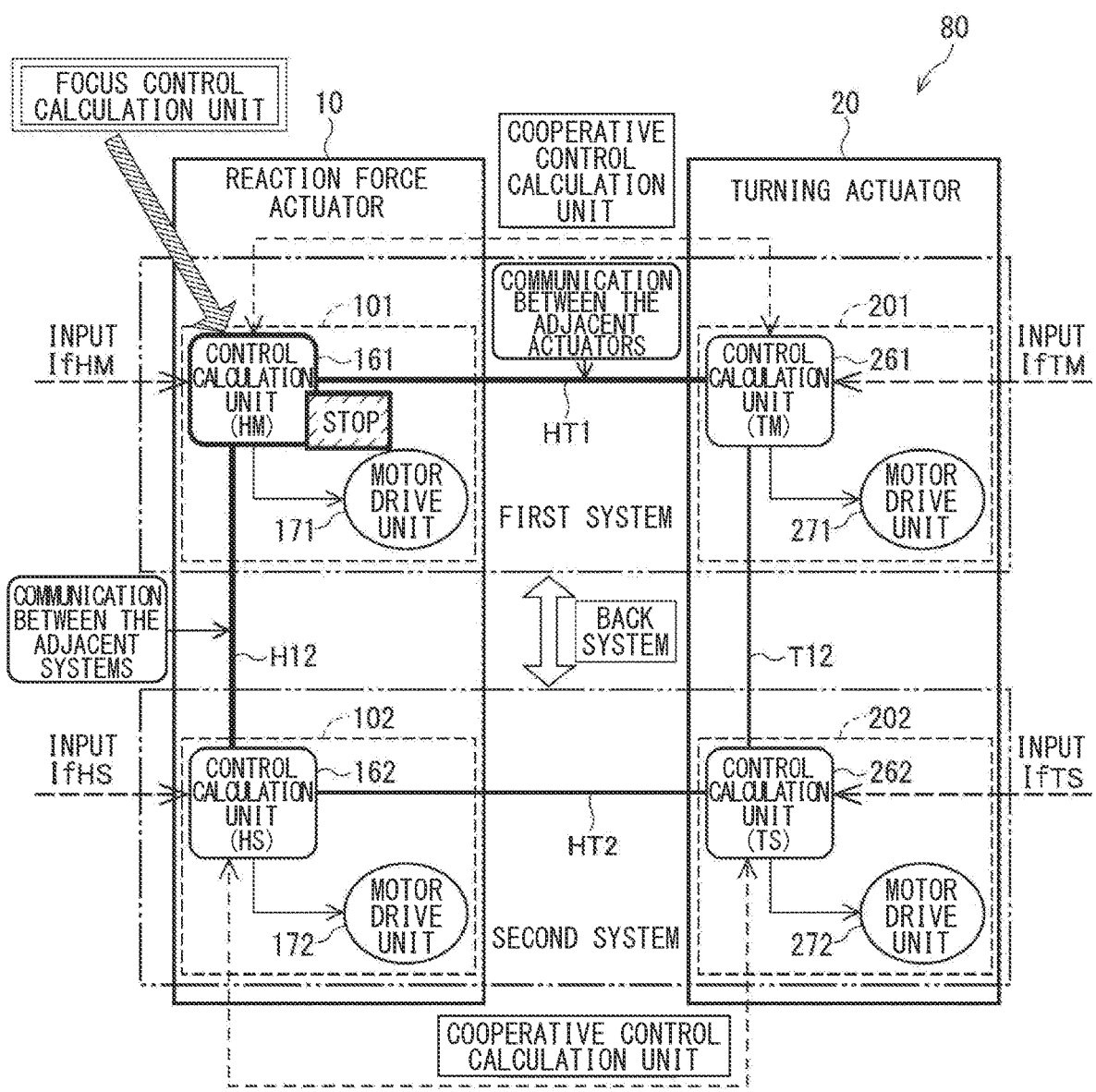
FIG. 5 is a diagram showing a state in which a focus control calculation unit (for example, a control calculation unit in a first system of a reaction force actuator=HM) is stopped.

Further, a control calculation unit 161 of the first system of the reaction force actuator 10 is represented by a symbol "HM", a control calculation unit 162 of the second system of the reaction force actuator 10 is represented by a symbol "HS", a control calculation unit 261 of the first system of the turning actuator 20 is represented by a symbol "TM", and a control calculation unit 262 of the second system of the turning actuator 20 is represented by a symbol "TS". In FIGS. 1, 2, and 5, each control calculation unit is represented by a name and a number in addition to the above symbol, but in the other figures, each control calculation unit is represented only by symbols of HM, HS, TM, and TS. Further, the communications H12 and T12 between the systems and the communications HT1 and HT2 between the actuators indicated by the double-headed arrows between the control calculation units 161 and 162, 261 and 262 will be described later with reference to FIG. 2.

Since a basic configuration of each of the actuators 10 and 20 is the same, the points where one of the explanations is sufficient will be described by the elements of the reaction force actuator 10 as a representative. The turning actuator 20 can be interpreted by reading the corresponding reference numeral. The control calculation unit (HM) 161 and the control calculation unit (HS) 162 are specifically composed of a microcomputer and an ASIC, and perform calculations related to motor drive control. The control calculation unit (HM) 161 and the control calculation unit (HS) 162 may also execute controls other than the motor drive control, but the present specification does not refer to other controls.

Specifically, the control calculation unit (HM) 161 and the control calculation unit (HS) 162 include a CPU (ROM), RAM, I/O (not shown), a bus line connecting these configurations, and the like. The control calculation unit (HM) 161 and the control calculation unit (HS) 162 performs required control by executing software processing or hardware processing. The software processing may be implemented by causing the CPU to execute a program. The program may be stored beforehand in a memory device such as a ROM, that is, in a readable non-transitory tangible storage medium. The hardware processing may be implemented by a special purpose electronic circuit.

The motor drive units 171 and 172 drive the motors based on the drive signals generated by the corresponding control calculation unit (HM) 161 and the control calculation unit (HS) 162, and output a torque. For example, in a polyphase brushless motor, the motor drive units 171 and 172 are composed of an inverter that supplies voltage, a polyphase winding wound around a stator, a rotor having a permanent magnet, and the like. The motor drive units 171 and 172 in two systems cooperate to output the torque. For example, the motor drive units 171 and 172 may be configured as a double winding motor in which two polyphase windings are wound around a common stator.

In the figure, an arrow from the control calculation unit (HM) 161 to the motor drive unit 171 and an arrow from the control calculation unit (HS) 162 to the motor drive unit 172 respectively indicate a drive signal of each system. In the case of the polyphase brushless motor, the drive signal is a switching pulse signal of an inverter, and is typically a PWM signal or the like.

The control calculation unit (HM) 161 and the control calculation unit (HS) 162 of the reaction force actuator 10 acquire a turning torque trq-s, a road surface reaction force, and the like, and generate a drive signal based on such information. The control calculation unit (TM) 261 and the control calculation unit (TS) 262 of the turning actuator 20 acquire a steering angle or a turning angle θt, a rack stroke Xr, and the like, and generate a drive signal based on such information.

As described above, in the present specification, a term "actuator" is used as a unit drive device including two control calculation units and two motor drive units. For example, in Patent Document, apart from the ECU that calculates the drive signal, only the motor main body portion, which is a mechanical element, is treated as an actuator, and the interpretation of term "actuator" is different from the present specification. The actuator of the present embodiment may be a so-called "mechatronics-integrated" motor in which the control calculation unit and the motor drive unit are physically integrated. Alternatively, as a so-called "mechatronics separated type" motor, the control calculation unit and the motor drive unit may be separately configured via a signal line.

FIG. 2 shows a simplified schematic diagram of the motor drive system 80 of FIG. 1. That is, the configuration as the steer-by-wire system 90 is omitted, and the configuration of the "motor drive system 80 including the reaction force actuator 10 and the turning actuator 20 having a two-system redundant configuration" is simply illustrated. In FIG. 2, a broken line frame is shown for the first system and the second system of the actuators 10 and 20, and the reference numerals are given to "first system 101, 201" and "second system 102, 202". However, in the following explanation, a code of the system may be omitted as appropriate in places that are obvious from the context.

Although it partially overlaps with the description of FIG. 1, the configurations of the actuators 10 and 20 will be described again. The reaction force actuator 10 is redundantly provided with the control calculation unit (HM) 161 of the first system 101 and the control calculation unit (HS) 162 of the second system 102, and is also redundantly provided with the motor drive unit 171 of the first system 101 and the motor drive unit 172 of the second system 102. The turning actuator 20 is redundantly provided with the control calculation unit (TM) 261 of the first system 201 and the control calculation unit (TS) 262 of the second system 202, and is also redundantly provided with the motor drive unit 271 of the first system 201 and the motor drive unit 272 of the second system 202.

In each of the actuators 10 and 20, information such as the turning torque trq-s signal, a feedback signal of the steering angle or the turning angle θt, and the rack stroke Xr, and the like are redundantly input to the control calculation unit of each system. That is, instead of one information signal being branched and input to the control calculation unit of each system, an information signal generated exclusively for the first system is input to the first system and an information generated exclusively for the second system is input is input to the second system.

For example, regarding the reaction force actuator 10, an information IfHM is redundantly input to the control calculation unit (HM) 161 of the first system 101, and an information IfHS is redundantly input to the control calculation unit (HS) 162 of the second system 102. Further, regarding the turning actuator 20, an information IfTM is redundantly input to the control calculation unit (TM) 261 of the first system 201, and an information IfTS is redundantly input to the control calculation unit (TS) 262 of the second system 202.

The control calculation units of the back system in each of the actuators 10 and 20 transmit and receive information to and from each other by the communication between the systems. That is, the control calculation unit (HM) 161 of the first system and the control calculation unit (HS) 162 of the second system of the reaction force actuator 10 mutually transmit and receive information by the communication H12 between the systems. Further, the control calculation unit (TM) 261 of the first system and the control calculation unit (TS) 262 of the second system of the turning actuator 20 mutually transmit and receive information by the communication T12 between the systems.

The information transmitted to each other by the communication H12 and T12 between the systems includes, for example, an input value from the outside, a current command value calculated by the control calculation unit, a current limit value, an actual current to be fed back, and the like. The control calculation units of the back system can be operated by the "collaborative drive mode" in which torque is output to the motor drive unit based on the information transmitted and received from each other by the communication between the systems. The collaborative drive mode will be described in detail later.

The first system of the reaction force actuator 10 and the first system of the turning actuator 20 form a pair with each other. Further, the second system of the reaction force actuator 10 and the second system of the turning actuator 20 form a pair with each other. The control calculation unit of the system paired with each other in the reaction force actuator and the turning actuator is referred to as a "cooperative control calculation unit". The cooperative control calculation units of the first system, that is, the control calculation unit (HM) 161 and the control calculation unit (TM) 261 mutually transmit and receive information by the communication HT1 between the actuators. The cooperative control calculation units of the second system, that is, the control calculation unit (HS) 162 and the control calculation unit (TS) 262 mutually transmit and receive information by the communication HT2 between the actuators.

The information transmitted to and received from each other by the communication HT1 and HT2 between the actuators includes the Information similar to information transmitted to and received from each other by the communication H12 and T12 by the systems, and an abnormality information of the control calculation unit or the motor drive unit. The cooperative control calculation units can operate in cooperation with each other based on the information transmitted and received from each other by the communication between the actuators. The reaction force actuator 10 and the turning actuator 20 operate while basically correlating with each other according to a difference in the steering angle of the steering wheel 91 or the wheel 99 with respect to the motor rotation angle. Since the meaning is different from the "collaborative" drive by the control calculation units of the back system in the same actuator, the term "cooperative" is used in this specification.

Next, with reference to FIGS. 3A to 4B, a collaborative drive mode, an independent drive mode, and a single system drive mode will be described as drive modes in which two control calculation units in the same actuator output torque to the motor drive unit. The collaborative drive mode is a normal mode from the viewpoint of whether the control calculation unit is normal or abnormal. The independent drive mode corresponds to the "recoverable mode" in which each control calculation unit can operate when a computer is turned off momentarily but the failure is not confirmed and there is a possibility of returning to normal operation. The single system drive mode corresponds to the "failure determination mode" in which the control calculation unit of the back system of the failure system can operate when the failure is confirmed and there is no possibility of returning to the normal operation. Each drive mode is used in the description of FIGS. 6 to 10.

Here, it is assumed that an electrical characteristics of the two systems in the same actuator are equivalent. In the following, the four control calculation units 161, 162, 261, and 262 of the two systems for each actuator will be described using the symbols HM, HS, TM, and TS without using name and number. Of the four control calculation units HM, HS, TM, and TS, any of the control calculation units of interest is referred to as a "focus control calculation unit". Then, the control calculation unit HM of the first system of the reaction force actuator 10 will be described as the focus control calculation unit. Similarly, the operation when the other control calculation units HS, TM, and TS are used as the focus control calculation units can be inferred.

FIGS. 3A to 4B show output characteristics in which the control calculation units TM and TS of the turning actuator 20 output torque to the corresponding motor drive units 271 and 272 according to the motor rotation speed. The motor output is constant in a region where the motor rotation speed is a critical value ωc or less, and in a region where the motor rotation speed exceeds the critical value ωc, the motor output gradually decreases as the motor rotation speed increases. In the collaborative drive mode shown in FIG. 3A, the two control calculation units TM and TS commonly use information such as command values and limit values to cause the motor drive units 271 and 272 to output equivalent torque. Therefore, a total torque of the two systems is twice the torque of each system.

Figure 3A:
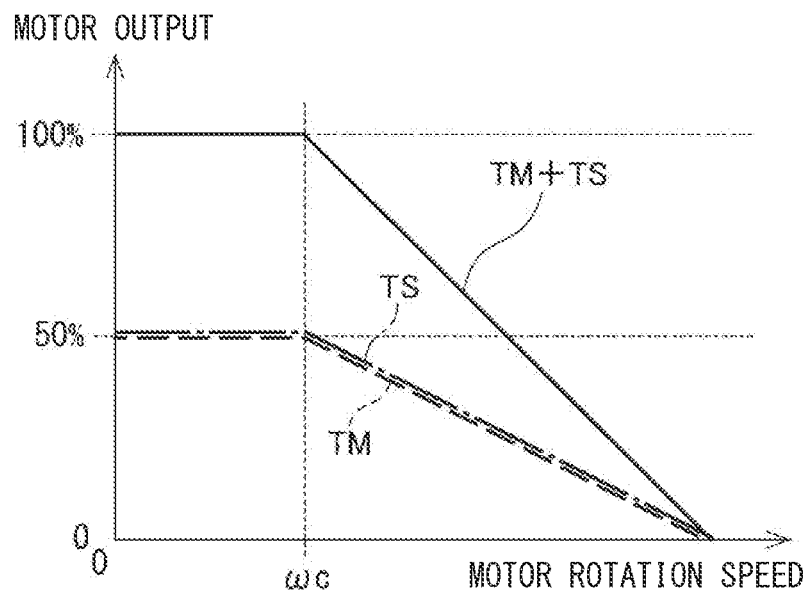
FIG. 3A is a characteristic diagram of a motor rotation speed and a motor output in a collaborative drive mode by control calculation units in two systems of the same actuator.
Figure 3B:
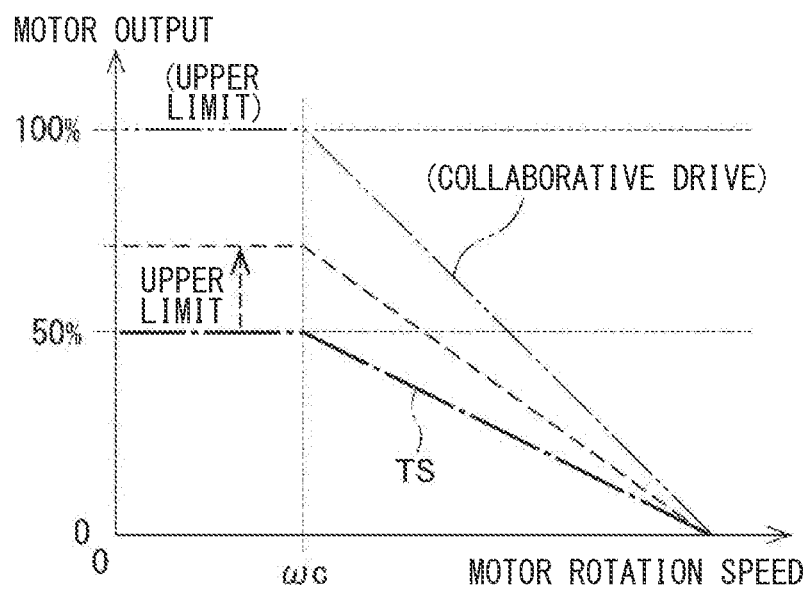
FIG. 3B is a characteristic diagram of a motor rotation speed and a motor output in a single system drive mode by control calculation units in two systems of the same actuator.

In the single system drive mode shown in FIG. 3B, when the failure of the focus control calculation unit is confirmed, the torque is output to the control calculation unit corresponding to the control calculation unit of the back system of the system where the failure occurred. When the failure of the control calculation unit HM is confirmed, the control calculation unit HS of the back system outputs torque only to the motor drive unit 172 of the second system of the reaction force actuator 10. Further, when the cooperative control calculation unit TM is stopped due to the failure confirmation of the control calculation unit HM, the control calculation unit TS of the back system outputs torque only to the motor drive unit 272 of the second system of the turning actuator 20.

In this case, an upper limit of the output torque may be set to 50% of an upper limit torque of the collaborative drive mode as shown by the alternate long and short dash line, and the upper limit of the output torque may be set to be larger than 50% of the upper limit torque of the collaborative drive mode as shown by the long dashed line.

Figure 4A:
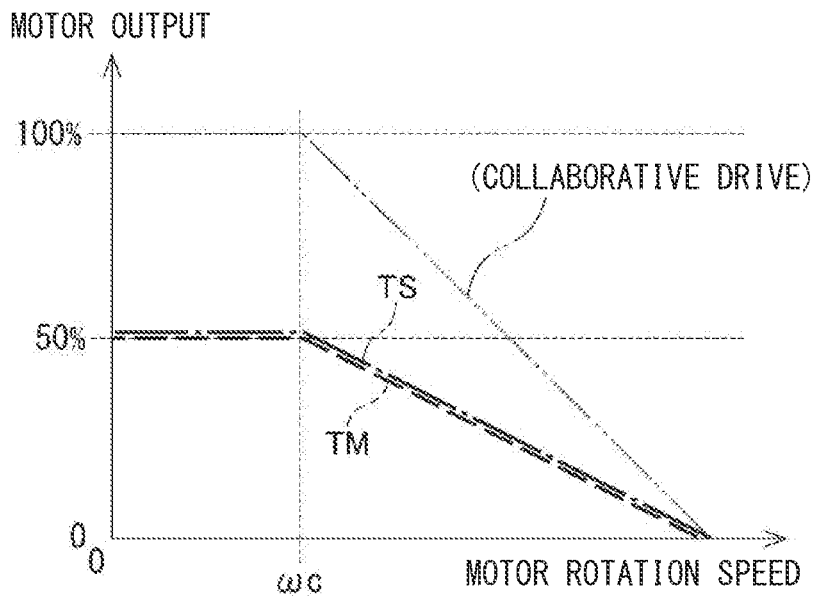
FIG. 4A is a characteristic diagram of a motor rotation speed and a motor output when the output of each system is not limited in an independent drive mode by control calculation units in two systems of the same actuator.
Figure 4B:
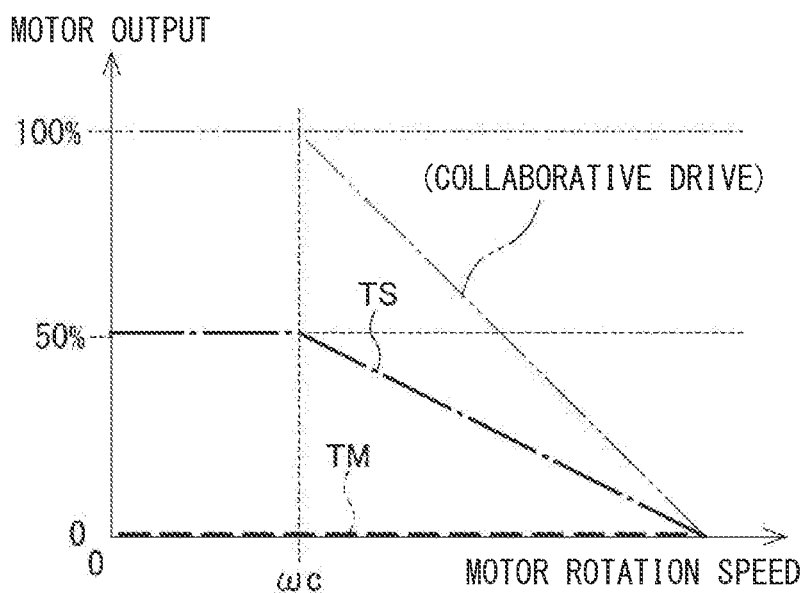
FIG. 4B is a characteristic diagram of a motor rotation speed and a motor output when the output of one system is limited in an independent drive mode by control calculation units in two systems of the same actuator.

In the independent drive mode shown in FIGS. 4A and 4B, when there is a possibility that the focus control calculation unit returns to normal operation, each control calculation unit does not use information from the communication between the systems and outputs the torque for one system to the motor drive unit in own system based on its own calculation result. When the output is not limited as shown in FIG. 4A, if the control calculation results of each control calculation unit based on the input information are the same, the control calculation units TM and TS of each system have the same output characteristics as the collaborative drive mode so as to output the same torque to the motor drive units 271 and 272.

FIG. 4B shows the output characteristics when one of the control calculation units TM limits the output of the motor drive unit 271 in the independent drive mode. In particular, in this example, since the output is limited to 0, substantially only the control calculation unit TS of the back system causes the motor drive unit 272 to output torque. In another example, an output limit value larger than 0 may be set so that the control calculation unit TM outputs a slight torque to the motor drive unit 272.

Next, as shown in FIG. 5, it is assumed that the focus control calculation unit HM stopped operation during normal operation. During normal operation before the operation is stopped, the focus control calculation unit HM operates in the collaborative drive mode with the control calculation unit HS of the back system by the communication H12 between the systems, and operates in cooperation with the cooperative control calculation unit TM by the communication HT1 between the actuators.

In a communication configuration, the control calculation unit HS of the back system of the focus control calculation unit HM and the cooperative control calculation unit TM of the focus control calculation unit HM are both adjacent to the focus control calculation unit HM. Therefore, the communication H12 between the systems between the focus control calculation unit HM and the control calculation unit HS of the back system of the focus control calculation unit HM is referred to as a "communication between the adjacent systems". Further, the communication HT1 between the actuator between the focus control calculation unit HM and the cooperative control calculation unit TM of the focus control calculation unit HM is referred to as a "communication between the adjacent actuators". The communication T12 between the systems between the focus control calculation unit TM and the control calculation unit TS is not the communication between the adjacent systems, and the communication HT2 between the actuators between the control calculation unit HS and the control calculation unit TS is not the communication between the adjacent actuators.

It is conceivable that the cause of the stop of operation of the focus control calculation unit HM is that a failure actually occurs in the computer, motor drive unit, etc. of the control calculation unit, and that the computer is turned off instantaneously due to a power failure or a computer reset. In other words, regarding the cause of the operation stop, there is a possibility of a permanent abnormality that requires replacement or repair of parts, or a possibility of a temporary stop that can return to normal operation instead of an actual failure.

If the focus control calculation unit HM actually fails, the information input to the cooperative control calculation unit TM via the communication HT1 between the adjacent actuators also becomes an abnormal value, and there is a possibility that the motor drive unit 271 of the turning actuator 20 controlled by the cooperative control calculation unit TM may output erroneously. As a result, the vehicle may be deflected in a direction not intended by the driver. Therefore, from the viewpoint of fail-safe, it is considered preferable that the cooperative control calculation unit TM together with the focus control calculation unit HM stops the motor drive control, and the control calculation units HS and TS of the back system of the actuators 10 and 20 continue the motor drive control.

However, since the operation is switched from the collaborative drive mode in two systems during the normal operation to single system drive mode, the maximum output is limited in many cases, and the system function is deteriorated. Therefore, when the operation stop of the focus control calculation unit HM is instantaneous and the normal operation can be restored, it is not preferable to always stop the motor drive control by the focus control calculation unit HM and the cooperative control calculation unit TM due to excessive fail-safe. Therefore, the motor drive system 80 of the present embodiment prevents the function of the focus control calculation unit HM from being excessively stopped even though the normal operation thereof can be restored when the focus control calculation unit HM is stopped momentarily.

Subsequently, the operation of the present embodiment will be described in detail with reference to the time charts and flowcharts of FIGS. 6 to 10. Each time chart shows the drive mode of each control calculation unit HM, HS, TM, and TS, and switching between normal or interruption (OFF) of the communication H12 between the adjacent systems and the communication HT1 between the adjacent actuators. In the flowchart, a symbol S indicates a step. In addition, the number of step in the flowchart are added in the following sentences and in the corresponding parts of the time chart.

As an outline of operation, the motor drive system 80 switches process depending on whether or not the focus control calculation unit HM returns within a predetermined return waiting time of the communication, after the focus control calculation unit HM is stopped during operation and at least one of the communication H12 between the adjacent systems or the communication HT1 between the adjacent actuators is interrupted. That is, if the focus control calculation unit HM returns within the return waiting time of the communication, it is determined to be a momentary stop. On the other hand, if the return waiting time of the communication elapses without the focus control calculation unit HM recovering, it is determined that the failure has occurred. After that, a process is performed to stop the motor drive control by the focus control calculation unit HM and the cooperative control calculation unit TM. In short, the stop process in the single system stop is executed by confirming a two-step stop decision.

Figure 7:
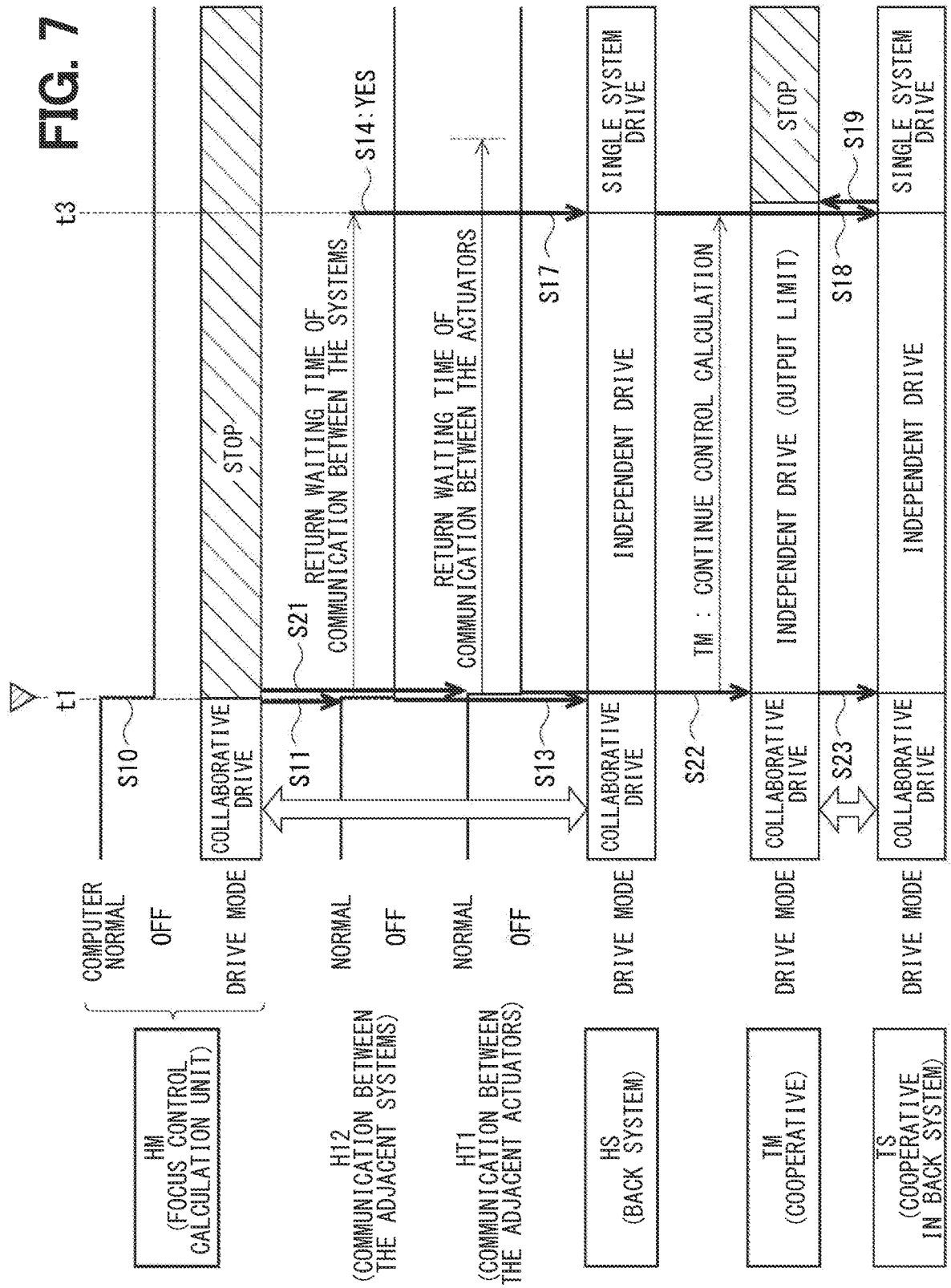
FIG. 7 is a time chart showing an operation when a return waiting time of a communication between the systems has elapsed after the focus control calculation unit is stopped.
Figure 9:
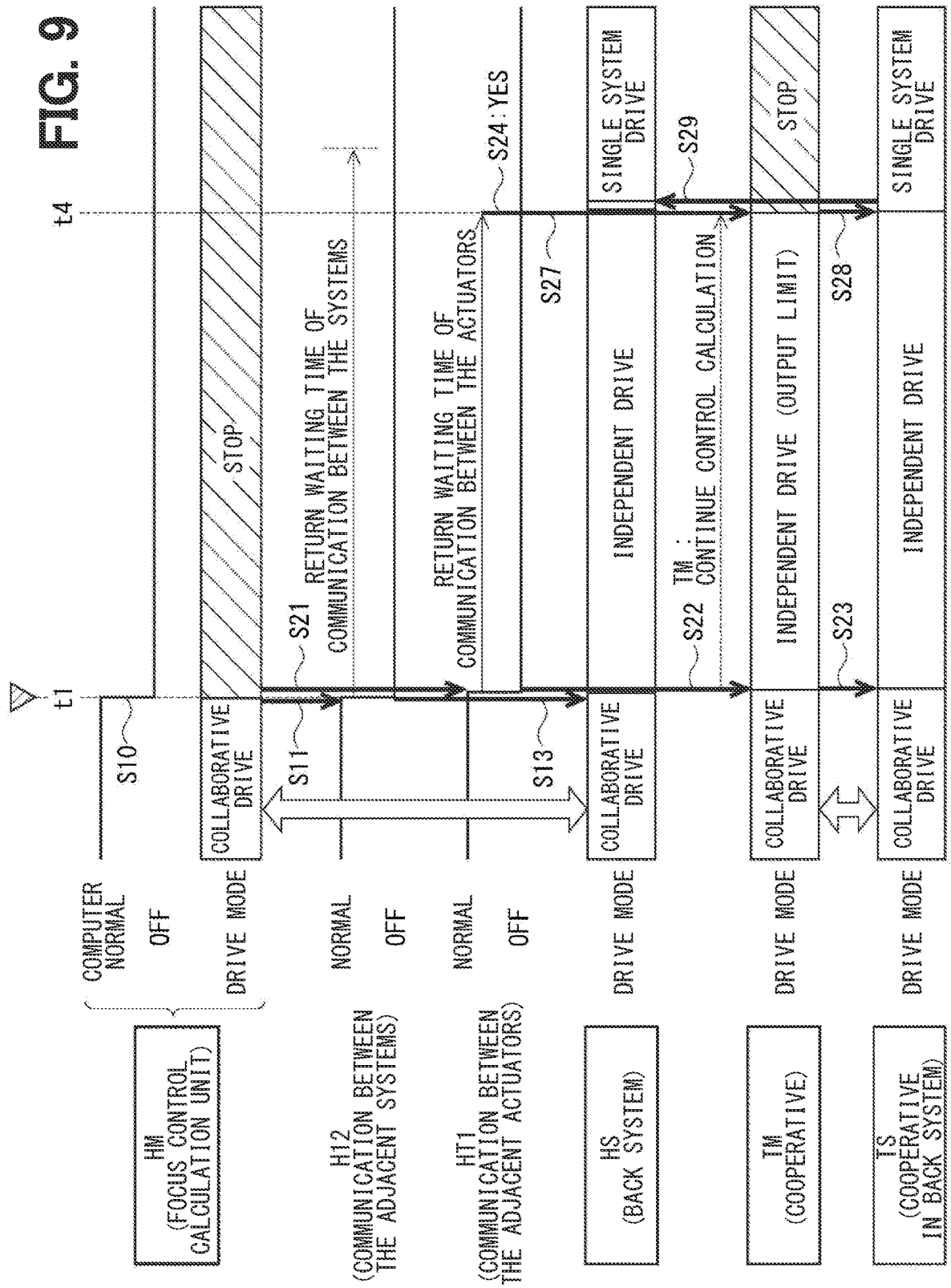
FIG. 9 is a time chart showing an operation when a return waiting time for a communication between the actuators has elapsed after the focus control calculation unit is stopped.

In a typical embodiment, a configuration example in which the "return waiting time of the communication between the systems" and the "return waiting time of the communication between the actuators" are set twice will be described. In FIGS. 7 and 9, two operation patterns are shown according to the shorter time of the "return waiting time of the communication between the systems" and the "return waiting time of the communication between the actuators".

Figure 6:
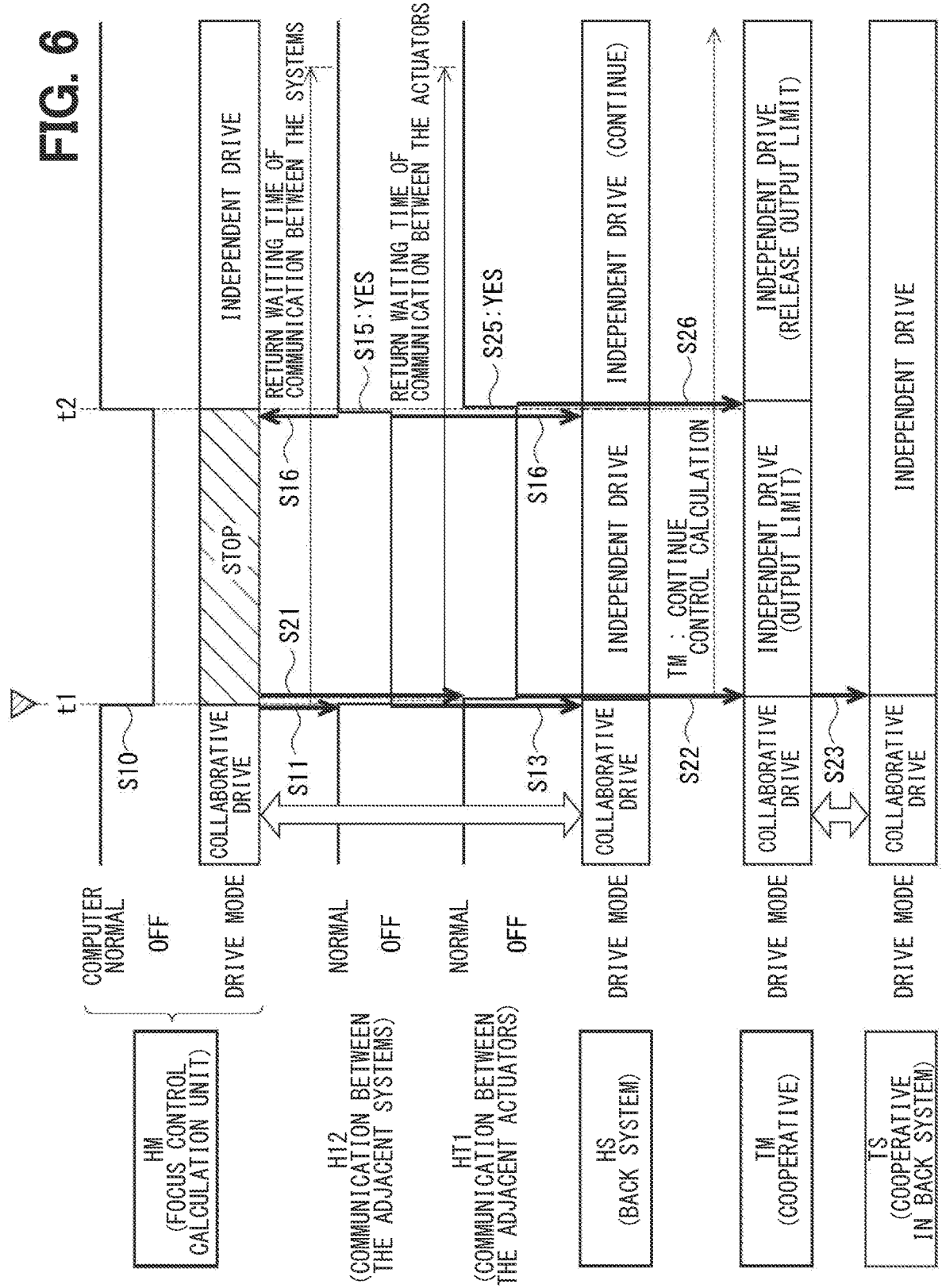
FIG. 6 is a time chart showing an operation in the case of returning within a return waiting time of a communication from a stop of the focus control calculation unit.

FIG. 6 shows an operation when the focus control calculation unit HM returns within the return waiting time of the communication from the stop of the focus control calculation unit HM. During normal operation before time t1, each control calculation unit HM, HS, TM, and TS are operating in the collaborative drive mode. In the figure, the relationship of collaborative drive is shown by a bidirectional block arrow. At time t1, the computer of the focus control calculation unit HM is turned off, and the drive mode of the focus control calculation unit HM is stopped (S10). At this time, in the motor drive system 80, the communication H12 between the adjacent systems and the communication HT1 between the adjacent actuators are interrupted (S11, S21). Depending on the OFF (interrupted) situation, only one of the communication H12 between the adjacent systems or the communication HT1 between the adjacent actuators may be interrupted.

When the communication H12 between the adjacent systems is interrupted, the control calculation unit HS of the back system shifts from the collaborative drive mode to the independent drive mode (S13). The control calculation unit HS of the back system operates in the independent mode for a period equal to or longer than the return waiting time of the communication between the systems. When the communication HT1 between the adjacent actuators is interrupted, the cooperative control calculation unit TM shifts from the collaborative drive mode to the independent drive mode while continuing the control calculation. The cooperative control calculation unit TM continues the control calculation for a period equal to or longer than the return waiting time of the communication between the actuators. Further, the cooperative control calculation unit TM limits the output of the motor drive unit 271 in order to prevent unintended operation of the actuator during the period for continuing the control calculation during the interruption of the communication HT1 between the adjacent actuators (S22). The control calculation unit TS of the back system of the cooperative control calculation unit TM shifts from the collaborative drive mode to the independent drive mode (S23).

At time t2, within the return waiting time of the communication between the systems and within the return waiting time of the communication between the actuators after the stop of the focus control calculation unit HM, it is assumed that the computer of the focus control calculation unit HM returns to ON, and the communication H12 between the adjacent systems and the communication HT1 between the adjacent actuators return.

Upon returning of the communication H12 between the adjacent systems (S15: YES), the focus control calculation unit HM starts the operation in the independent drive mode, and the control calculation unit HS of the back system continues the operation in the independent drive mode (S16). Further, by returning the communication HT1 between the adjacent actuators (S25: YES), the cooperative control calculation unit TM releases the output limit of the motor drive unit 271 and operates in the independent drive mode (S26). At this time, since the control calculation is continued even during the interruption of the communication HT1 between the adjacent actuators, the continuity of the information from before the momentary stop is ensured. The control calculation unit TS of the back system of the cooperative control calculation unit TM continues to operate in the independent drive mode.

FIG. 7 shows an operation when the return waiting time of the communication between the systems has elapsed without returning after the focus control calculation unit HM is stopped. In this example, the condition is set that the return waiting time of the communication between the systems is set shorter than the return waiting time of the communication between the actuators, or the return waiting time of the communication between the systems has priority over the return waiting time of the communication between the actuators. When the return waiting time of the communication between the systems has elapsed at time t3 (S14: YES), the failure is confirmed, and the control calculation unit HS of the back system shifts from the independent drive mode to the single system drive mode (S17), while the focus control calculation unit HM is stopped.

Then, based on the information transmitted from the control calculation unit HS of the back system by the communication HT2 between the actuators, the cooperative control calculation unit TS of the back system shifts from the independent drive mode to the single system drive mode (S18). Then, based on the information transmitted from the cooperative control calculation unit TS of the back system by the communication T12 between the systems, the cooperative control calculation unit TM of the focus control calculation unit HM stops the control calculation from the output limit state in the independent drive mode (S19). As a result, the motor drive control by the focus control calculation unit HM and the cooperative control calculation unit TM is stopped.

Figure 8:
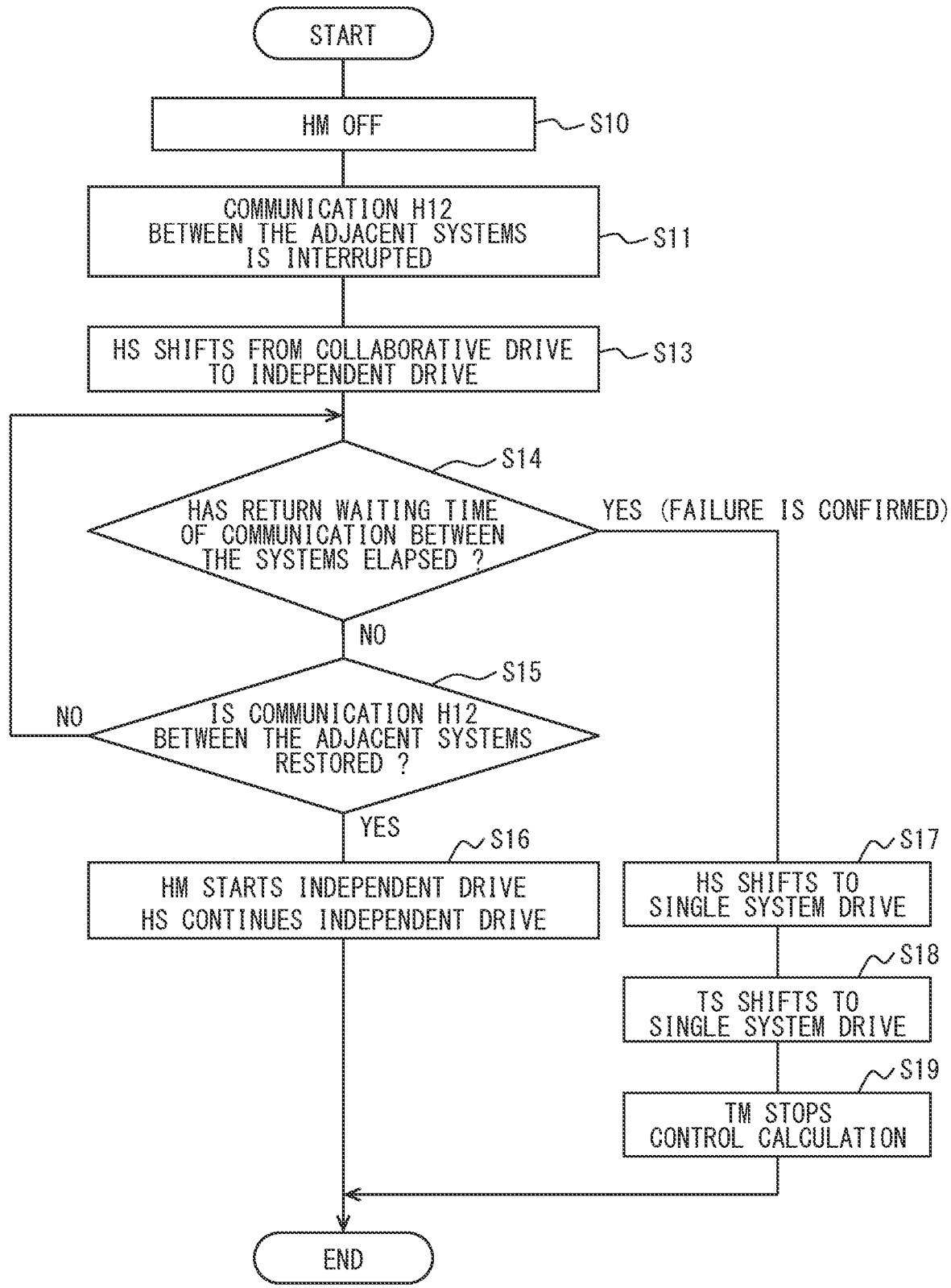
FIG. 8 is a flowchart showing process from a viewpoint of the control calculation unit of the back system of the focus control calculation unit (for example, a control calculation unit in a back system of a reaction force actuator=HS)

The flowchart of FIG. 8 shows the processes of FIGS. 6 and 7 from the viewpoint of the control calculation unit HS of the back system of the focus control calculation unit HM. In the explanation of the flowchart, each control calculation unit is represented only by a symbol, and the process of each step is simply described. When the HM is turned off in S10, the communication H12 between the adjacent systems is interrupted in S11. In S13, the HS shifts from the collaborative drive mode to the independent drive mode.

In S14, it is determined whether the return waiting time of the communication between the systems has elapsed since the HM was stopped. If the return waiting time of the communication between the systems has not elapsed and it is determined as NO in S14, in S15, the HS determines whether the communication H12 between the adjacent systems has been restored. If NO in S15, the process returns to S14. When the communication H12 between the adjacent systems is restored and it is determined as YES in S15, in S16, the HS continues the independent drive.

If the return waiting time of the communication between the systems has elapsed and it is determined as YES in S14, in S17, the HS shifts to the single system drive mode. Subsequently, in S18, the TS shifts to the single system drive mode, and in S19, the TM stops the control calculation.

FIG. 9 shows an operation when the return waiting time of the communication between the actuators has elapsed without returning after the focus control calculation unit HM is stopped. In this example, the condition is set that the return waiting time of the communication between the actuators is set shorter than the return waiting time of the communication between the systems, or the return waiting time of the communication between the actuators has priority over the return waiting time of the communication between the systems. When the return waiting time of the communication between the actuators has elapsed at time t4 (S24: YES), the failure is confirmed, and the cooperative control calculation unit TM stops the control calculation from the output limit in the independent drive mode (S27). As a result, the motor drive control by the focus control calculation unit HM and the cooperative control calculation unit TM is stopped.

Then, based on the information transmitted from the cooperative control calculation unit TM by the communication T12 between the systems, the control calculation unit TS of the back system shifts from the independent drive mode to the single system drive mode (S28). Then, based on the information transmitted from the control calculation unit TS of the back system of the cooperative control calculation unit TM by the communication HT2 between the actuators, the cooperative control calculation unit HS of the back system of the focus control calculation unit HM shifts from the independent drive mode to the single system drive mode (S29).

Figure 10:
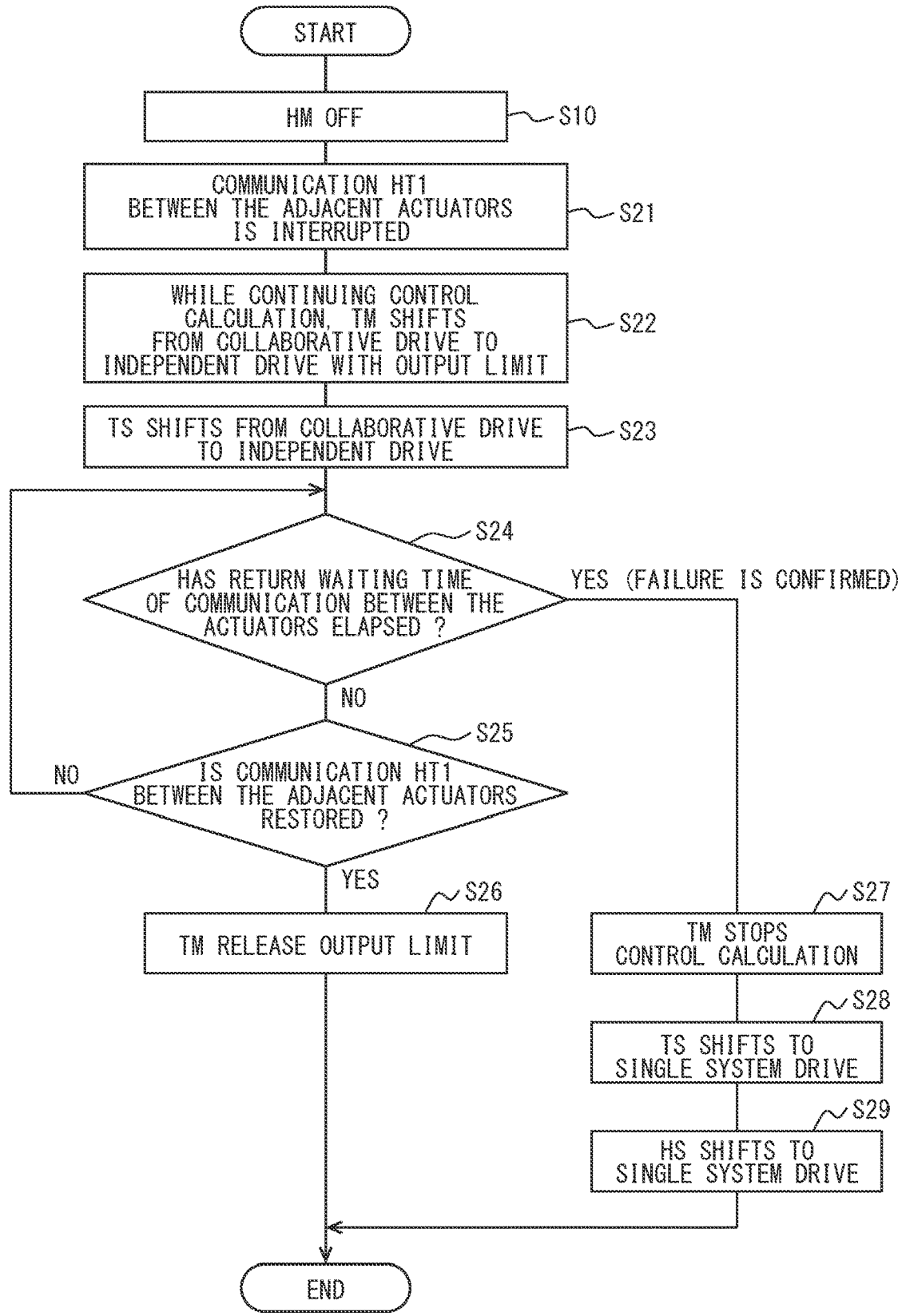
FIG. 10 is a flowchart showing process from a viewpoint of a cooperative control calculation unit (for example, a control calculation unit in a first system of a turning actuator=TM) of the focus control calculation unit.

The flowchart of FIG. 10 shows the processes of FIGS. 6 and 9 from the viewpoint of the cooperative control calculation unit TM of the focus control calculation unit HM. When the HM is turned off in S10 common to FIG. 8, the communication HT1 between the actuators is interrupted in S21. In S22, the TM shifts from the collaborative drive mode to the independent drive mode while continuing the control calculation, and further limits the output. In S23, the TS shifts from the collaborative drive mode to the independent drive mode.

In S24, the TM determines whether the return waiting time of the communication between the actuators has elapsed since the HM was stopped. If the return waiting time of the communication between the actuators has not elapsed and it is determined as NO in S24, in S25, the TM determines whether the communication HT1 between the adjacent systems has been restored. If NO in S25, the process returns to S24. When the communication HT1 between the adjacent actuators is restored and it is determined as YES in S25, the TM releases the output limit in S26 and operates in the independent drive mode.

If the return waiting time of the communication between the actuators has elapsed and it is determined as YES in S24, in S27, the TM stops the control calculation. Subsequently, in S28, the TS shifts to the single system drive mode, and in S29, the HS shifts to the single system drive mode.

As described above, the motor drive system 80 of the present embodiment restores the communication H12 between the adjacent systems and the communication HT1 between the adjacent actuators, when the focus control calculation unit returns to the normal operation after the focus control calculation unit HM is stopped and at least one of the communication H12 between the adjacent systems or the communication HT1 between the adjacent actuators. Then, by resuming the motor drive control, excessive failsafe can be avoided and the system function can be suitably maintained.

On the other hand, if the focus control calculation unit HM does not recover after the focus control calculation unit HM is stopped and a predetermined return waiting time of the communication elapses, the failure is confirmed. At this time, it is determined that there is no possibility of returning to the normal operation, and the stop measures are executed. When the focus control calculation unit HM fails, the cooperative control calculation unit TM stops driving the motor together, it is possible to prevent the vehicle from being deflected in a direction not intended by the driver due to an erroneous output of the cooperative control calculation unit TM due to an abnormal value transmitted from the focus control calculation unit HM.

The motor drive system 80 of the present embodiment switches the drive mode between the control calculation units of the back systems of the actuators 10 and 20 at the time of stopping and at the time of returning so that the output of the corresponding motor drive unit can be managed appropriately. Further, when the communication HT1 between the adjacent actuators is interrupted, the cooperative control calculation unit TM continues the control calculation, so that the continuity of the information from before the momentary stop can be ensured at the time of recovery. Further, the cooperative control calculation unit TM can prevent the actuator from unintentional operation by restricting the output to the motor drive unit 271 for a period in which the control calculation is continued.

Other Embodiments (A) The return waiting time of the communication from the stop of the focus control calculation unit HM is not set, for example, and until an ignition is turned off in an engine vehicle, the communication H12 between the adjacent systems and the communication HT1 between the adjacent actuators may be left in a state of being interrupted. In reality, the same result will be obtained when the predetermined return waiting time of the communication is set to a sufficiently long time of several hours.

(B) In the above embodiment, the return waiting time of the communication between the systems and the return waiting time of the communication between the actuators are set double, and the process according to the time chart of FIG. 7 or 9 is executed based on the one of the return waiting time of the communication between the systems and the return waiting time of the communication between the actuators that has passed earlier. On the other hand, only the return waiting time of the communication between the systems may be set so that only the process of FIG. 7 is executed, or only the return waiting time of the communication between the actuators may be set and only the process of FIG. 9 is executed.

(C) As shown in FIG. 6, when the focus control calculation unit HM returns before the return waiting time of the communication elapses, each control calculation unit shifts to the independent drive mode as the "recoverable mode". Further, the control calculation units of two systems in the same actuator may shift from the independent drive mode to the collaborative drive mode.

(D) In the above embodiment, the first system 101 of the reaction force actuator 10 and the first system 201 of the turning actuator 20 form a pair with each other, and the second system 102 of the reaction force actuator 10 and the second system 202 of the turning actuator 20 are paired with each other. That is, the systems having the same number form a pair with each other, and the control calculation unit constitutes the "cooperative control calculation unit". However, the terms "first system" and "second system" are only assigned for convenience, and it is free to decide which of the two systems is "first system" and which of the two system is "second system". Depending on the system, the "first system of the reaction force actuator" and the "second system of the turning actuator" may form a pair, and the "second system of the reaction force actuator" and the "first system of the turning actuator" may form a pair.

The present disclosure is not limited to the embodiment described above but various modifications may be made within the scope of the present disclosure.

The control calculation unit and method described in the present disclosure may be implemented by a special purpose computer which is configured with a memory and a processor programmed to execute one or more particular functions embodied in computer programs of the memory. Alternatively, the control calculation unit described in the present disclosure and the method thereof may be realized by a dedicated computer configured as a processor with one or more dedicated hardware logic circuits. Alternatively, the control calculation unit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A motor drive system in a steer-by-wire system in which a steering mechanism and a turning mechanism of a vehicle are mechanically separated, comprising:
    a reaction force actuator configured to function as a motor that outputs a reaction force torque according to a driver's steering torque and a road surface reaction force; and
    a turning actuator configured to function as a motor that outputs a turning torque for turning wheels, wherein
    each of the reaction force actuator and the turning actuator has two control calculation units provided redundantly that perform a calculation related to a motor drive control, and two motor drive units provided redundantly that drive and output a torque based on a drive signal generated by a corresponding control calculation unit,
    when the two sets of control calculation units and motor drive units corresponding to each other in each actuator are defined as a first system and a second system, respectively, and the other system viewed from one system is defined as a back system,
    the control calculation units of the back system in each actuator operate by a collaborative drive mode in which the torque is output to the motor drive unit by using an information transmitted and received mutually by a communication between the systems in common,
    in the reaction force actuator and the turning actuator, cooperative control calculation units, which are control calculation units of the systems paired with each other, operate in cooperation with each other based on an information transmitted and received mutually by a communication between the actuators,
    when, of four control calculation units of the two systems for each actuator, one of the control calculation units of interest is defined as a focus control calculation unit,
    the communication between the systems between the focus control calculation unit and the control calculation unit of the back system of the focus control calculation unit is defined as a communication between the adjacent systems, and
    the communication between the actuators between the focus control calculation unit and the cooperative control calculation unit of the focus control calculation unit is defined to as a communication between the adjacent actuators,
    the communication between the adjacent systems and the communication between the adjacent actuators are restored, when the focus control calculation unit is restored, after the focus control calculation unit is stopped during operation and at least one of the communication between the adjacent systems or the communication between the adjacent actuators is interrupted,
wherein
    each of the control calculation units is operated by
        the collaborative drive mode,
        a recoverable mode in which the torque is output to the motor drive unit of the own system based on a calculation result of itself without using the information by the communication between the systems, when there is a possibility of returning to a normal operation of the focus control calculation unit, and
        a failure determination mode in which the torque is output to the motor drive unit of the control calculation unit corresponding to the control calculation unit of the back system of the system where a failure occurred, when the failure of the focus control calculation unit is confirmed,
wherein
    a predetermined return waiting time of the communication between the systems and a predetermined return waiting time of the communication between the actuators from the stop of the focus control calculation unit are set twice, and
wherein
    in a configuration in which the return waiting time of the communication between the systems is set shorter than the return waiting time of the communication between the actuators,
        when the communication between the adjacent systems is interrupted due to a stop of the focus control calculation unit,
            the control calculation unit of the back system of the focus control calculation unit operates in the recoverable mode for a period equal to or longer than a predetermined return waiting time of the communication between the systems from the stop of the focus control calculation unit, and
        when the communication between the adjacent actuators is interrupted due to the stop of the focus control calculation unit,
            the cooperative control calculation unit of the focus control calculation unit continues the control calculation for a period equal to or longer than a predetermined return waiting time of the communication between the actuators from the stop of the focus control calculation unit.

2. The motor drive system according to claim 1, wherein
in a configuration in which the return waiting time of the communication between the systems is set shorter than the return waiting time of the communication between the actuators,
when the communication between the adjacent systems is restored by a restoration of the focus control calculation unit within the return waiting time of the communication between the systems from the stop of the focus control calculation unit,
the focus control calculation unit starts operation in the recoverable mode, and
the control calculation unit of the back system of the focus control calculation unit continues to operate in the recoverable mode.

3. The motor drive system according to claim 2, wherein
in a configuration in which the return waiting time of the communication between the systems is set shorter than the return waiting time of the communication between the actuators,
the cooperative control calculation unit of the focus control calculation unit limits the output of the motor drive unit for a period during which the control calculation is continued during an interruption of communication between the adjacent actuators.

4. The motor drive system according to claim 3, wherein
when the communication between the adjacent actuators is restored by a restoration of the focus control calculation unit within the return waiting time of the communication between the actuators from the stop of the focus control calculation unit,
the cooperative control calculation unit of the focus control calculation unit releases the output limit of the motor drive unit.

5. The motor drive system according to claim 2, wherein
in a configuration in which the return waiting time of the communication between the systems is set shorter than the return waiting time of the communication between the actuators,
when the return waiting time of the communication between the actuators has elapsed without the communication between the actuators having returned after the focus control calculation unit is stopped,
the cooperative control calculation unit of the focus control calculation unit stops the control calculation.

6. The motor drive system according to claim 1, wherein
in a configuration in which the return waiting time of the communication between the systems is set shorter than the return waiting time of the communication between the actuators,
when the return waiting time of the communication between the systems has elapsed without the communication between the systems being restored after the focus control calculation unit is stopped,
the control calculation unit of the back system of the focus control calculation unit shifts to the failure determination mode.

7. A motor drive system in a steer-by-wire system in which a steering mechanism and a turning mechanism of a vehicle are mechanically separated, comprising:
a reaction force actuator configured to function as a motor that outputs a reaction force torque according to a driver's steering torque and a road surface reaction force; and
a turning actuator configured to function as a motor that outputs a turning torque for turning wheels, wherein
each of the reaction force actuator and the turning actuator has two control calculation units provided redundantly that perform a calculation related to a motor drive control, and two motor drive units provided redundantly that drive and output a torque based on a drive signal generated by a corresponding control calculation unit,
when the two sets of control calculation units and motor drive units corresponding to each other in each actuator are defined as a first system and a second system, respectively, and the other system viewed from one system is defined as a back system,
the control calculation units of the back system in each actuator operate by a collaborative drive mode in which the torque is output to the motor drive unit by using an information transmitted and received mutually by a communication between the systems in common,
in the reaction force actuator and the turning actuator, cooperative control calculation units, which are control calculation units of the systems paired with each other, operate in cooperation with each other based on an information transmitted and received mutually by a communication between the actuators,
when, of four control calculation units of the two systems for each actuator, one of the control calculation units of interest is defined as a focus control calculation unit,
the communication between the systems between the focus control calculation unit and the control calculation unit of the back system of the focus control calculation unit is defined as a communication between the adjacent systems, and
the communication between the actuators between the focus control calculation unit and the cooperative control calculation unit of the focus control calculation unit is defined to as a communication between the adjacent actuators,
the communication between the adjacent systems and the communication between the adjacent actuators are restored, when the focus control calculation unit is restored, after the focus control calculation unit is stopped during operation and at least one of the communication between the adjacent systems or the communication between the adjacent actuators is interrupted,
wherein
when the communication between the adjacent actuators is interrupted due to the stop of the focus control calculation unit,
the cooperative control calculation unit of the focus control calculation unit continues the control calculation for a period equal to or longer than a predetermined return waiting time of the communication between the actuators from the stop of the focus control calculation unit, and
wherein
in a configuration in which the return waiting time of the communication between the systems is set shorter than the return waiting time of the communication between the actuators,
the cooperative control calculation unit of the focus control calculation unit limits the output of the motor drive unit for a period during which the control calculation is continued during an interruption of communication between the adjacent actuators.

8. A motor drive system in a steer-by-wire system in which a steering mechanism and a turning mechanism of a vehicle are mechanically separated, comprising:

a reaction force actuator configured to function as a motor that outputs a reaction force torque according to a driver's steering torque and a road surface reaction force; and a turning actuator configured to function as a motor that outputs a turning torque for turning wheels, wherein each of the reaction force actuator and the turning actuator has two control calculation units provided redundantly that perform a calculation related to a motor drive control, and two motor drive units provided redundantly that drive and output a torque based on a drive signal generated by a corresponding control calculation unit, when the two sets of control calculation units and motor drive units corresponding to each other in each actuator are defined as a first system and a second system, respectively, and the other system viewed from one system is defined as a back system, the control calculation units of the back system in each actuator operate by a collaborative drive mode in which the torque is output to the motor drive unit by using an information transmitted and received mutually by a communication between the systems in common, in the reaction force actuator and the turning actuator, cooperative control calculation units, which are control calculation units of the systems paired with each other, operate in cooperation with each other based on an information transmitted and received mutually by a communication between the actuators, when, of four control calculation units of the two systems for each actuator, one of the control calculation units of interest is defined as a focus control calculation unit, the communication between the systems between the focus control calculation unit and the control calculation unit of the back system of the focus control calculation unit is defined as a communication between the adjacent systems, and the communication between the actuators between the focus control calculation unit and the cooperative control calculation unit of the focus control calculation unit is defined to as a communication between the adjacent actuators, the communication between the adjacent systems and the communication between the adjacent actuators are restored, when the focus control calculation unit is restored, after the focus control calculation unit is stopped during operation and at least one of the communication between the adjacent systems or the communication between the adjacent actuators is interrupted, wherein each of the control calculation units is operated by
the collaborative drive mode,
a recoverable mode in which the torque is output to the motor drive unit of the own system based on a calculation result of itself without using the information by the communication between the systems, when there is a possibility of returning to a normal operation of the focus control calculation unit, and
a failure determination mode in which the torque is output to the motor drive unit of the control calculation unit corresponding to the control calculation unit of the back system of the system where a failure occurred, when the failure of the focus control calculation unit is confirmed, wherein when the communication between the adjacent systems is interrupted due to a stop of the focus control calculation unit,
the control calculation unit of the back system of the focus control calculation unit operates in the recoverable mode for a period equal to or longer than a predetermined return waiting time of the communication between the systems from the stop of the focus control calculation unit, and wherein in a configuration in which the return waiting time of the communication between the systems is set shorter than the return waiting time of the communication between the actuators,
when the communication between the adjacent systems is restored by a restoration of the focus control calculation unit within the return waiting time of the communication between the systems from the stop of the focus control calculation unit,
the focus control calculation unit starts operation in the recoverable mode, and
the control calculation unit of the back system of the focus control calculation unit continues to operate in the recoverable mode.

9. A motor drive system in a steer-by-wire system in which a steering mechanism and a turning mechanism of a vehicle are mechanically separated, comprising:

a reaction force actuator configured to function as a motor that outputs a reaction force torque according to a driver's steering torque and a road surface reaction force; and a turning actuator configured to function as a motor that outputs a turning torque for turning wheels, wherein each of the reaction force actuator and the turning actuator has two control calculation units provided redundantly that perform a calculation related to a motor drive control, and two motor drive units provided redundantly that drive and output a torque based on a drive signal generated by a corresponding control calculation unit, when the two sets of control calculation units and motor drive units corresponding to each other in each actuator are defined as a first system and a second system, respectively, and the other system viewed from one system is defined as a back system, the control calculation units of the back system in each actuator operate by a collaborative drive mode in which the torque is output to the motor drive unit by using an information transmitted and received mutually by a communication between the systems in common, in the reaction force actuator and the turning actuator, cooperative control calculation units, which are control calculation units of the systems paired with each other, operate in cooperation with each other based on an information transmitted and received mutually by a communication between the actuators, when, of four control calculation units of the two systems for each actuator, one of the control calculation units of interest is defined as a focus control calculation unit,
the communication between the systems between the focus control calculation unit and the control calculation unit of the back system of the focus control calculation unit is defined as a communication between the adjacent systems, and
the communication between the actuators between the focus control calculation unit and the cooperative control calculation unit of the focus control calculation unit is defined to as a communication between the adjacent actuators,
the communication between the adjacent systems and the communication between the adjacent actuators are restored, when the focus control calculation unit is restored, after the focus control calculation unit is stopped during operation and at least one of the communication between the adjacent systems or the communication between the adjacent actuators is interrupted, wherein when the communication between the adjacent actuators is interrupted due to the stop of the focus control calculation unit,
the cooperative control calculation unit of the focus control calculation unit continues the control calculation for a period equal to or longer than a predetermined return waiting time of the communication between the actuators from the stop of the focus control calculation unit, and wherein in a configuration in which the return waiting time of the communication between the systems is set shorter than the return waiting time of the communication between the actuators,
when the return waiting time of the communication between the actuators has elapsed without the communication between the actuators having returned after the focus control calculation unit is stopped,
the cooperative control calculation unit of the focus control calculation unit stops the control calculation.

* * * * *